May 3, 1960 G. HESSLER 2,935,329
CHUCK AND COLLET THEREFOR
Filed May 20, 1959

INVENTOR.
GEORGE HESSLER
BY
Richard W. Treverton
ATTORNEY the axes of surfaces 19, 20 are coincident with axis 13.

Figure 2:
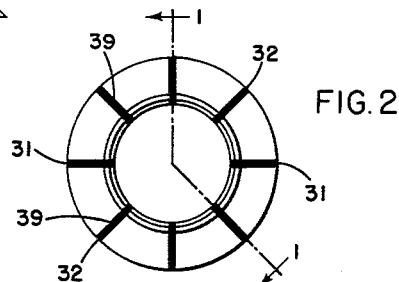
Figure 3:
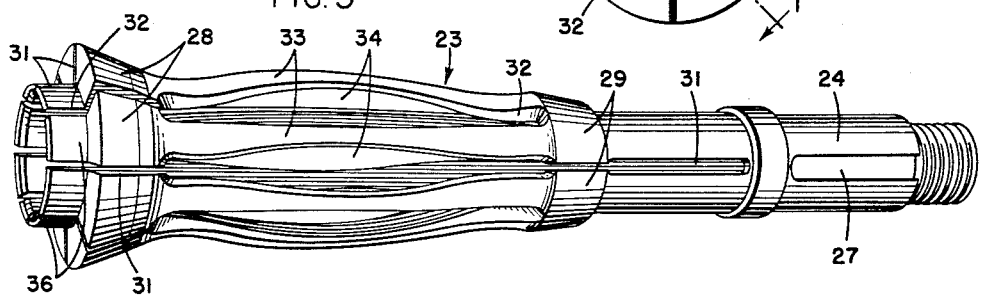

The collet 23 shown in Figs. 2 and 3 has limited axial motion in the body 10. It comprises a cylindrical stem 24 slidable in a bore in the rear of the body and provided with a threaded connection to a draw rod 25 which is connectible to a suitable chuck actuator, not shown. Usually such actuator comprises a hydraulic cylinder carried by the spindle 12 and having a piston connectible to the draw rod. A key 26 engaging in a keyway 27 in stem 24 holds the collet against rotation in the chuck body. Extending forwardly from stem 24 the collet has a substantially tubular portion split longitudinally to render it expansible and contractible radially. The split portion has two sets of workpiece-engaging sections, the sections 28 of the forward set being adapted to grip cylindrical surfaces S-1 of the pinion shank and sections 29 of the rear set being adapted to grip cylindrical shank surface S-2. For this purpose the inner faces of sections 28 and 29 are complementary in shape to the surfaces S-1 and S-2.

Such gripping action occurs upon rearward axial motion of the collet in the body 10, and results from the surfaces 19 and 20 camming the sections 28 and 29 radially inwards. Preferably the outer faces of these sections are complementary in shape to the respective surfaces 19 and 20.

The longitudinally extending splits in the tubular portion of the collet all extend from the front of the collet. Half of them, designated 31, extend nearly to the inner end of the tubular portion, and the other half, designated 32 and arranged alternately with splits 31, terminate just short of the sections 29. Thus the splits in the particular collet illustrated divide the tubular portion into eight front work-gripping sections 28, four rear work-gripping sections 29, and eight parts 33 each of which connects two front sections 28 with the single rear section 29 that is longitudinally aligned with them. The connecting parts 33 are bowed in an axial plane, such as the plane of Fig. 1, to render them flexible longitudinally, thereby enabling limited relative motion in an axial direction between the two axially spaced sets of sections 28 and 29. This flexibility may of course be increased by decreasing the thickness of the parts 33 and also by decreasing their width, by widening the splits 31, 32, as shown at 34 in Fig. 3.

Figure 1:
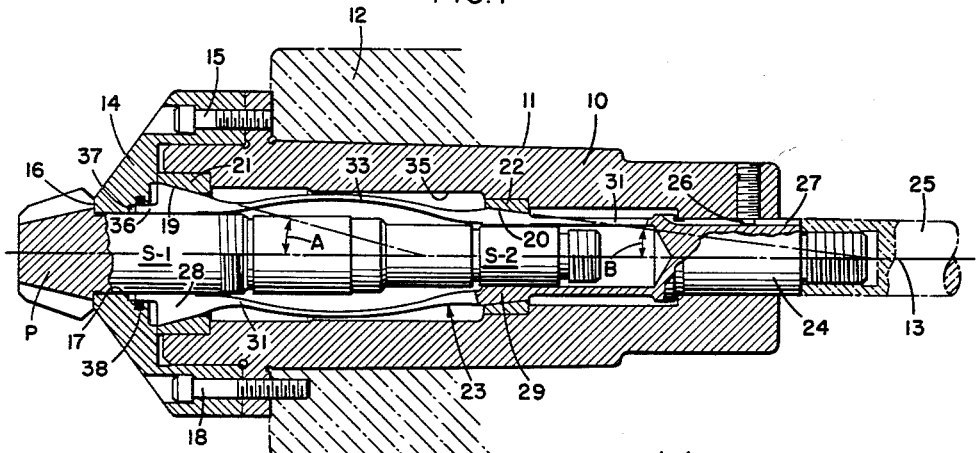

In the normal, unflexed condition of the collet, the sections 28 and 29 are spaced radially outwards from their contracted or work-gripping position, so that the shank of a workpiece P may be easily inserted in or removed from the chuck. In the unflexed condition of bowed parts 33 the work-gripping sections 28 and 29 are axially spaced from each other by a distance slightly less (a few thousandths of an inch less in the chuck illustrated) than are the surfaces 19 and 20, so that upon rearward motion of the collet effected by the draw rod 25, i.e. motion to the right in Fig. 1, the sections 28 will be deflected radially inwards into gripping relation to surface S-1 before the sections 29 are brought into gripping relation to surface S-2. Therefore after sections 28 have centered and firmly gripped the workpiece the sections 29 may have a small further continued axial motion, permitted by flexure of parts 33, until sections 29 firmly grip the surface S-2. Fig. 1 shows the position wherein sections 28 grip the workpiece but sections 29 are still slightly spaced from surface S-2. In practice this space is only a few thousandths of an inch.

Release of the workpiece by the sections 28 and 29 is effected in the opposite order. That is, upon motion of draw rod 25 to the left, the sections 29 release first. The release of the sections 28 is delayed slightly by parts 33 returning to their normal condition of bow. Positive release of sections 28 is however assured by two features: One is that the half-cone angle A of the surface 19 and the engaging surface of sections 28 is greater than the static angle of friction of parts 23, 21, 22 (which are of hard steel). In the case illustrated the angle A is fifteen degrees, in contrast with half-cone angle B of surface 20 which is only seven degrees, and approximately equal to the static angle of friction. The lower angle results in a greater gripping force being exerted by the sections 29. The second feature is that the bore 35 so closely encircles the bellies of bowed parts 33 as to limit the radial expansion thereof to a safe degree. That is the parts 33 will slidingly contact the bore 35 before their elastic limit is exceeded, thus preventing damage to the collet resulting from excessive bowing of these parts should the sections 28 for any reason tend to stick during releasing action.

Releasing motion of the collet is limited by abutment of its forward extensions 36 with the forward wall of recess 37 in nose plate 14. The outer faces of extensions 36 constitute a substantially cylindrical surface in contact with an O-ring seal 38 that is retained in an annular groove in plate 14. The interior of the chuck is further sealed by a rubber-like filler shown at 39 in Fig. 2, but omitted from Figs. 1 and 3, which is applied to the splits 31, 32.

Figure 4:
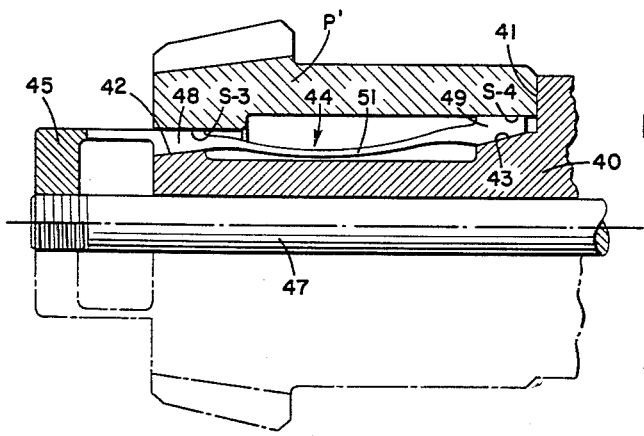

The device shown in Fig. 4 is essentially an inversion of that shown in Figs. 1 to 3, and is for chucking a workpiece P' having an internal bore with cylindrical surfaces S–3 and S–4. The chuck body 40 has a seat 41 for the rear face of the workpiece and axially spaced conical surfaces 42 and 43 respectively of seven degree and fifteen degree half-cone angle for expanding the collet 44 to center and grip the surfaces S–3, S–4. The collet comprises an end portion 45 secured to the forward end of draw rod 47, and a longitudinally split tubular portion extending rearwardly therefrom. This split portion comprises front and rear work-gripping sections 48 and 49, and longitudinally bowed parts 51 connecting axially aligned sections 48 and 49. The sections 48 and 49 are so related to each other and to cam surfaces 42 and 43 that upon rearward motion of the collet effected by draw rod 47, i.e. motion to the right in Fig. 4, the sections 49 will center and grip surface S–4 slightly before sections 48 grip surface S–3. During the forward or releasing motion of the collet the sections 48 release the workpiece before the sections 49. Fig. 4 shows the position wherein sections 49 grip the workpiece surface S–4 but sections 48 are slightly spaced from surface S–3.

This sequential gripping action, which occurs in each of the afore-described embodiments of the invention because of the longitudinal flexibility of bowed parts 33 or 51, assures work-gripping action by both the front and rear sections, 28 and 29 or 48 and 49, even though the surfaces S–1 and S–2 or of surfaces S–3 and S–4 may be slightly undersize or oversize by reason of allowed manufacturing tolerances.

Having now described preferred embodiments of my invention and explained the operation thereof, what I claim is:

1. A chuck comprising a body and a collet supported thereby for axial motion, the collet having a split tubular portion provided with axially spaced sets of workpiece engaging sections, the splits extending longitudinally and separating the sections of each set from each other and also separating from each other parts of the collet which connect longitudinally aligned sections of the spaced sets, such connecting parts being bowed in an axial plane to render them flexible longitudinally to thereby enable limited motion in an axial direction between said axially spaced sets of sections, the body having axially spaced surfaces cooperating respectively with said sets of workpiece-engaging sections for deflecting them radially to grip the workpiece upon axial motion of the collet in one direction, and said sets being so related to each other and to said surfaces of the body, in the unflexed condition of said bowed parts, that upon motion of the collet in said one direction the workpiece-engaging sections of one set will be deflected into work-gripping position before those of the other set.

2. A chuck according to claim 1 in which the body has a surface disposed adjacent the bellies of the bowed parts to limit the bowing thereof.

3. A chuck according to claim 1 in which the body has on the front thereof a seat for engagement with a surface of the workpiece to position the latter axially in the chuck, and said axially spaced surfaces are arranged to deflect the work-engaging sections into work-gripping position upon rearward movement of the collet.

4. A chuck according to claim 1 in which the one of said axially spaced surfaces which cooperates with said one set of work-engaging sections is inclined to the axis of the chuck at an angle greater than the static angle of friction thereof.

5. A chuck according to claim 4 in which the one of said axially spaced surfaces which cooperates with said other set of work engaging sections is inclined to the axis of the chuck at a smaller angle than that which cooperates with said one set.

6. A chuck according to claim 1 wherein the end of the collet which leads upon motion in said one direction is adapted for connection to a collet actuator, and said sets of work-engaging sections are so disposed relative to each other and to said axially spaced surfaces of the body that upon such motion the sections of the trailing set will be deflected into work-gripping position before those of the leading set.

7. A chuck according to claim 1 wherein the collet is adapted for connection to an actuator at the end thereof which trails upon motion in said one direction, and said sets of work-engaging sections are so related that upon such motion the sections of the leading set will be deflected into work-gripping position before those of the trailing set.

8. A chuck according to claim 1 in which all of said splits extend from one end of the collet and terminate short of the other end thereof, all of said splits extending between the work-gripping sections of one set and between the bowed parts, and alternate ones of said splits extending between the work-gripping sections of the other set.

9. A chuck according to claim 1 in which the collet is telescoped within the body and said axially spaced surfaces encircle said work-gripping sections.

10. A chuck according to claim 1 in which the collet is telescoped over the body and said work-gripping sections extend around said axially spaced surfaces.

11. A radially expansible and contractible chuck collet having a split tubular portion provided with axially spaced sets of workpiece-engaging sections, the splits extending longitudinally and separating the sections of each set from each other and also separating parts of the collet which connect longitudinally aligned sections of the spaced sets, such connecting parts being bowed in an axial plane to render them flexible longitudinally to thereby enable limited motion in an axial direction between said axially spaced sets of sections, each of said sections having a face substantially complementary to the surface of the workpiece that is to be gripped thereby and an opposite face conforming to a conical surface coaxial to such cylindrical surface.

References Cited in the file of this patent

UNITED STATES PATENTS

| | | |
|---|---|---|
| 1,812,144 | Earl | June 30, 1931 |
| 2,176,071 | Hall | Oct. 17, 1939 |
| 2,610,066 | Pigott | Sept. 9, 1952 |
| 2,708,117 | Flory | May 10, 1955 |
| 2,755,094 | Benjamin | July 17, 1956 |